(12) United States Patent
Reichhardt

(10) Patent No.: US 9,824,438 B2
(45) Date of Patent: Nov. 21, 2017

(54) METHOD FOR TESTING AN AGRICULTURAL SPRAYING DEVICE

(71) Applicant: Andreas Reichhardt, Hungen (DE)

(72) Inventor: Andreas Reichhardt, Hungen (DE)

( * ) Notice: Subject to any disclaimer, the term of this patent is extended or adjusted under 35 U.S.C. 154(b) by 0 days.

(21) Appl. No.: 15/174,145

(22) Filed: Jun. 6, 2016

(65) Prior Publication Data

US 2017/0024870 A1  Jan. 26, 2017

(30) Foreign Application Priority Data

Jul. 22, 2015  (DE) .................. 10 2015 111 889

(51) Int. Cl.
*G06T 7/00* (2017.01)
*B05B 12/00* (2006.01)
*B05B 1/14* (2006.01)
*A01M 7/00* (2006.01)
*G06K 9/62* (2006.01)
*G06K 9/20* (2006.01)

(52) U.S. Cl.
CPC ............ *G06T 7/001* (2013.01); *A01M 7/0089* (2013.01); *B05B 1/14* (2013.01); *B05B 12/004* (2013.01); *G06K 9/209* (2013.01); *G06K 9/2027* (2013.01); *G06K 9/6202* (2013.01); *G06T 2207/30164* (2013.01)

(58) Field of Classification Search
CPC ........ B05B 12/082; G06T 2207/30108; G06T 7/001; G06T 7/0004
See application file for complete search history.

(56) References Cited

U.S. PATENT DOCUMENTS

| | | | | |
|---|---|---|---|---|
| 2,779,233 A * | 1/1957 | Dodge | ............... | G01N 15/0227 346/107.2 |
| 3,275,744 A * | 9/1966 | Dietrich | ............. | G01N 15/0227 348/132 |
| 5,423,520 A * | 6/1995 | Anderson | ............... | B22F 9/082 222/603 |
| 5,653,389 A * | 8/1997 | Henderson | .......... | A01M 7/0089 239/172 |
| 6,967,304 B2 * | 11/2005 | Gevelber | .............. | B05B 12/082 219/121.47 |
| 6,973,199 B2 * | 12/2005 | Farina | ..................... | G01P 5/001 250/573 |
| 7,188,271 B2 * | 3/2007 | Park | ................... | G11B 7/00736 369/53.17 |

(Continued)

FOREIGN PATENT DOCUMENTS

DE  198 295 94 C2  11/2001
DE  696 25 914 T2  11/2003

(Continued)

*Primary Examiner* — Wesley Tucker
(74) *Attorney, Agent, or Firm* — Collard & Roe, P.C.

(57) ABSTRACT

In a method for testing an agricultural spraying device (1) which comprises a plurality of nozzles (3) that are arranged at a spacing from one other and spray a liquid, which is supplied under pressure, in a defined atomizing cone (8), a region, near the nozzle, of the atomizing cone (8) of each individual nozzle (3) is optically recorded, in a direction perpendicular to the central axis of the atomizing cone (8), by means of a recording device (6) having a digital camera (7), and is stored as a digital image file.

12 Claims, 1 Drawing Sheet

(56) References Cited

U.S. PATENT DOCUMENTS

| | | | | |
|---|---|---|---|---|
| 7,188,781 | B2* | 3/2007 | Reighard | B05B 12/004 239/67 |
| 7,463,751 | B2* | 12/2008 | Farina | G01N 21/47 239/692 |
| 7,483,767 | B2* | 1/2009 | Montaser | B05B 12/082 700/283 |
| 7,738,694 | B2* | 6/2010 | Prociw | B05B 12/004 382/141 |
| 7,792,611 | B2* | 9/2010 | Scheer | B05B 12/082 239/11 |
| 8,134,703 | B2* | 3/2012 | Sivathanu | G01M 99/008 356/335 |
| 8,465,792 | B2* | 6/2013 | Marriott | B05B 12/004 118/313 |
| 2006/0072101 | A1* | 4/2006 | Park | G01P 5/001 356/28 |
| 2007/0242871 | A1 | 10/2007 | Prociw et al. | |
| 2007/0299561 | A1* | 12/2007 | Montaser | B05B 12/082 700/283 |
| 2008/0226133 | A1* | 9/2008 | Truche | B41J 2/2142 382/100 |

FOREIGN PATENT DOCUMENTS

| | | |
|---|---|---|
| DE | 19847258 B4 | 9/2008 |
| DE | 202015101107 U1 | 4/2015 |
| WO | 2007/106982 A1 | 9/2007 |

* cited by examiner

METHOD FOR TESTING AN AGRICULTURAL SPRAYING DEVICE

CROSS REFERENCE TO RELATED APPLICATIONS

Applicants claim priority under 35 U.S.C. §119 of German Patent Application No. 10 2015 111 889.0 filed Jul. 22, 2015.

FIELD OF THE INVENTION

The invention relates to a method for testing an agricultural spraying device that comprises a plurality of nozzles which are arranged at a spacing from one another and spray a liquid, which is supplied under pressure, in a defined atomizing cone.

BACKGROUND OF THE INVENTION

In agriculture, is it conventional to apply fertilizer, plant protectants and other substances which promote plant growth over the arable land in particular in an aqueous suspension or solution by means of a spraying device. The spraying device is generally arranged on a vehicle in this case and typically comprises a storage container for the substance to be sprayed, a pump for generating the spraying pressure, valves for controlling the quantity to be sprayed and a spray bar which projects over part of the arable land transversely to the direction of travel, and a plurality of nozzles arranged at a spacing from one another, to which the spray substance is supplied at a pressure that is suitable for forming an atomizing cone. A vehicle intended for agricultural use having a spraying device is known from DE 696 25 914 T2.

In agricultural spraying, it is important to spray the spray substances uniformly and in the desired or specified amount, and to avoid non-uniform spraying patterns since they can adversely affect the crop yield. The divergent spray jets or atomizing cones generated by the individual nozzles of the spraying device are particularly essential to uniform spraying. The spray substance which reaches the field area is only uniformly distributed in the longitudinal direction of the spraying bar if these jets or cones have an identical and correct formation at every nozzle. Uniform distribution over the area depends on the speed of the vehicle carrying the spraying device staying the same.

If individual nozzles are defective, for example as a result of wear or the deposition of particles, an incorrect atomizing cone can form and can thus affect the required uniform distribution of the spray substance. There is therefore a need to test the functions of an agricultural spraying device, in particular with regard to the generation of the atomizing cone by the nozzles.

DE 198 29 594 C2 discloses a method for determining the distribution quality of hydraulic or hydraulic-pneumatic nozzles over an entire plane to which an atomizing cone is applied by the nozzle. According to this method, the extent to which collecting containers arranged next to one another in a row in one plane are filled, is measured by the spray jet of the nozzle, the nozzle and the row of collecting containers being rotated relative to one another by a defined angle about the central axis of the nozzle. The distribution quality of the nozzle can then be calculated from the extent to which the individual containers are filled. The known method is suitable for testing individual nozzles under laboratory conditions. In order to test the nozzles of an agricultural spraying device quickly, said method is, however, too complex.

Furthermore, a method for determining the pattern and the quantity parameters of fuel nozzles used in gas turbines is known from WO 2007/106982 A1. In a variant of the method described herein, the atomizing cone of a nozzle is cut perpendicularly to the central axis by means of a planar laser beam and an optical image of the droplets of the atomizing cone, which droplets scatter the light of the planar laser beam, is captured by a digital camera. The image of the cross section of the atomizing cone that is lit up by the laser beam, which image is recorded by the camera and displayed on a screen, shows variations in the light intensity, high light intensity corresponding to high radiance. In order to calculate the spraying parameters, the distribution of the light intensity of the recorded image can then be divided into zones and evaluated similarly to with a mechanical patternator.

SUMMARY OF THE INVENTION

The object of the invention is to provide a method for testing an agricultural spraying device which can be carried out both quickly and at the point of use of the spraying device when necessary.

According to the invention, this object is accomplished by a method for testing an agricultural spraying device that comprises a plurality of nozzles that are arranged at a spacing from one another and spray a liquid, which is supplied under pressure, in a defined atomizing cone, in which method a region, near the nozzle, of the atomizing cone of each individual nozzle is optically recorded, in a direction perpendicular to the central axis of the atomizing cone, by a recording device having a digital camera, and is stored as a digital image file. The stored digital image files for the individual nozzles can then be compared with one another or can each be compared with an empirically determined reference image file in order to determine deviations between the image files or between each image file and the reference image file, and to evaluate said deviations in order to assess the state of the nozzle associated with a deviating image file. In this way, it is possible to test the spraying function of the nozzles of an agricultural spraying device with little effort and in a short time, and to obtain information regarding the functionality of the individual nozzles which can be measured and documented on the basis of objective criteria.

Image files or one image file and a reference image file can be compared by means of a computer using image analysis programs and said comparison can include criteria such as uniformity, shape, brightness differences, and the like. Since each image file is expected to deviate to some extent from the reference file, it is furthermore expedient to define tolerance criteria which determine the extent of acceptable deviations. Only if set tolerance criteria are exceeded will the evaluation of an image file provide an indication of a lack of functionality of the nozzle in question.

Contrary to the known spraying methods, however, the method according to the invention is not dependent on ascertaining the quantitative distribution of the spray substance over a cross section of the spray jet. For the types of nozzles used in a spraying device, this type of distribution is generally determined as being the result of the nozzle construction and is dependent on the pressure at which the spray substance is supplied to the nozzle. However, in the method according to the invention, the distribution profile of a fully operational nozzle of the nozzle type used is taken as a basis, and a reference image which is essential for the test is stored in a reference image file for this purpose. The test is then restricted to comparing the recorded image files of atomizing cone regions of the individual nozzles with an associated reference image file. Likewise, comparing the recorded image files with one another can lead to the detection of a nozzle fault, since a fault generally does not occur at the same time in all nozzles.

According to another proposal of the invention, when each atomizing cone region is being optically recorded, a defined background surface can be arranged behind the atomizing cone region when viewed from the camera. Arranging a background surface of this type provides uniform aspect ratios at each nozzle. The atomizing cone regions can therefore be optically recorded in any surroundings since image deviations caused by different backgrounds are prevented. It is therefore readily possible to optically record the atomizing cone, directly before use in the field, with the aid of a background surface.

Furthermore, according to the invention, the atomizing cone region can be illuminated during the optical recording process. It can be illuminated from the front in a simple manner, for example by means of a flash device arranged on the camera. Illumination transverse to the viewing direction of the camera by means of a lamp, or background illumination arranged behind a transparent background surface can also be advantageous.

According to another proposal of the invention, since the pressure of the liquid supplied to the nozzles influences the formation of the atomizing cone, the pressure of the liquid supplied to the nozzles is also measured when the atomizing cone regions are being optically recorded, and the measured value is stored in a manner associated with the image files. Accordingly, a reference image file that is designed for the pressure associated with the image file is used for comparison with the image file. If there is only one image reference file for a certain supplied liquid pressure, the atomizing cones recorded as image files for testing the nozzles have to be generated under the same supply pressure.

According to the invention, additional features, such as the time of the recording and an identification code which identifies the nozzle belonging to the image file and/or the position of the nozzle inside the spraying device, can also be associated with the stored image files.

By linking the image file with such features, a test carried out can be documented based on the time and nozzles, and when determining a deviation, the affected nozzle can be determined without any doubt. It is particularly advantageous for a transponder tag, in which the identification code and/or the position of the nozzle is readably stored, to be attached to the spraying device next to each nozzle, in order to identify the nozzles and/or the position of the nozzles in the spraying device.

The recording device can also be provided with a reading device for reading out the transponder tags such that, when the atomizing cone is optically recorded, the associated nozzle data can also be recorded at the same time.

According to another proposal of the invention, a mobile telecommunications appliance provided with a digital camera can be used as the recording device. Using a telecommunications appliance of this kind, the recorded and stored image files of the atomizing cones can be wirelessly transmitted to a remote computing unit, which stores the image files in a database and is provided with programs and data for evaluating the image files. The result of the evaluation can be transferred back to the mobile telecommunications appliance in order to inform the operator carrying out the test.

With regard to the computing power and the storage capacity of many mobile telecommunications appliances, any mobile telecommunications appliance can be used to carry out the method according to the invention and can be provided with reference image files and/or a program application for evaluating the image files. The comparison and evaluation can then be directly carried out by the telecommunications appliance. Similarly, mobile computers having a camera, for example tablets, netbooks or notebooks, can also be used as recording the device.

If the appliances used have a device for receiving and reading GNSS (global navigation satellite system) signals, geodetic features indicating the location of the test can also be stored together with the record image files. In this way, the nozzle equipment and atomizing cone design used to operate the spraying device at a point of use can be documented. By means of a second test immediately after the end of the spraying process, it can also be determined whether the state of the spraying device remains substantially unchanged or whether the atomizing cone has changed during spraying use. In this way, it is possible to decide on the quality of a spraying process.

BRIEF DESCRIPTION OF THE DRAWINGS

The invention will be explained in the following in more detail on the basis of an embodiment shown in the drawings, in which.

DETAILED DESCRIPTION OF THE DRAWINGS

Figure 1:
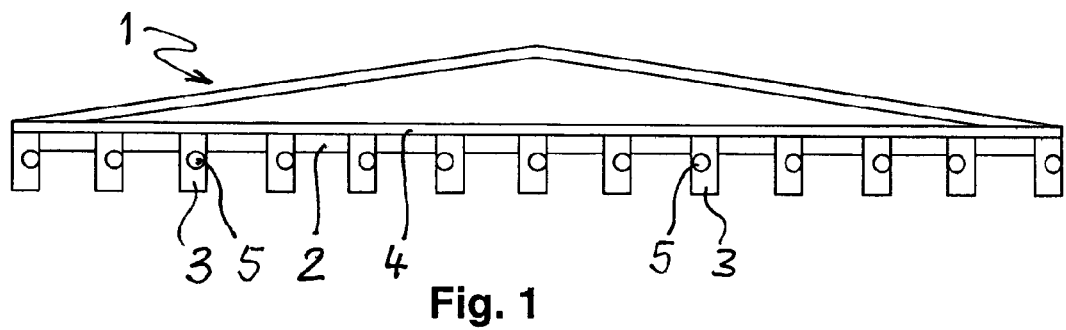
FIG. 1 is a schematic view of an agricultural spraying device.

FIG. 1 shows an agricultural spraying device 1 having a conventional construction and comprising a spraying bar 2, which is typically attached to a vehicle (not shown in this case), for example a tractor, transversely to the direction of travel. Nozzles 3 are fastened to the spraying bar 2 at regular intervals, to which nozzles a liquid spray substance is supplied under pressure via a line 4. The nozzles 3 are each provided with a transponder tag 5 in order to identify them. The line 4 is typically connected to a storage container via control valves and a pump. During the spraying operation, the pump conveys the spray substance from the storage container to the nozzles 3 via the lines 4 at a defined pressure which can be controlled by the control valves, at which nozzles the spray substance is discharged towards the ground in each case in the form of an atomizing cone. The spacing between the nozzles 3 and the cone angle of the atomizing cone generated by the nozzles 3 are adapted to one another such that, when close to the ground, a spray mist is formed which has a uniform density when viewed in the longitudinal direction of the spraying bar 2. If the formation of a uniform atomizing cone at a nozzle is disrupted as a result of wear or the deposition of particles of dirt in the spray substance, non-uniform distribution of the spray substance when viewed in the longitudinal direction of the spraying bar 4 can occur. Disadvantages resulting therefrom include regions of insufficient fertilization or insufficient protection. By means of the test method according to the invention, such disruptions can be reliably determined and resulting disadvantages can be avoided.

Figure 2:
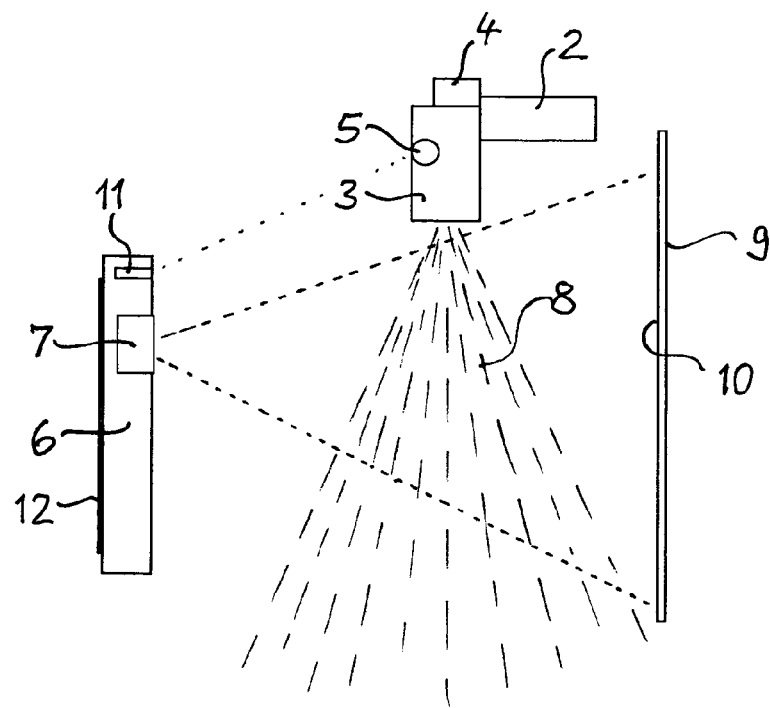
FIG. 2 is a schematic view of the optical recording of the atomizing cone of a nozzle by means of a recording device.

FIG. 2 shows the test method according to the invention. In order to carry out the test, the spraying device 1 is started up and sprays water as the spraying liquid, for example. At the individual nozzles 3, a region, near the nozzle, of the atomizing cone 8 of a nozzle 3 is then captured by a recording device 6 having a digital camera 7, for example a mobile telephone, a tablet or a notebook, and is stored in the form of a digital image file. The picture is preferably taken transversely to the longitudinal direction of the spraying bar 4 and substantially perpendicularly to the central axis of the atomizing cone 8. In order to avoid influences caused by the image background, it is advisable to take a picture of all the atomizing cones in front of the same background. If the spraying device does not have a uniform background surface, for each picture a sheet 9 can be arranged on the side of the atomizing cone 8 facing away from the camera 7, which sheet forms a background surface 10 having a suitable color.

The recording device 6 preferably comprises a screen 12 on which the captured image files can be shown. An experienced operator can view the captured image files one after another or even several next to one another and can already detect noticeable atomizing cone deviations. Irrespective thereof, the image files can be compared with one another or with a reference image file by a computer equipped with suitable programs, and can be evaluated in terms of unacceptable deviations.

The computer can be part of the recording device 6 or can be separate therefrom. If separate from the computer, the image files are transferred to a computer by means of suitable transfer devices or are processed directly in the terminal.

A transponder tag 5, which identifies the nozzle and indicates the position thereof on the spraying bar 2 of the spraying device 1, is preferably arranged on each nozzle 3. The recording device 6 is equipped with a reading device 11 for reading the transponder information from a short distance and, each time an atomizing cone 8 is optically recorded, can record the characteristics stored by the transponder for the particular nozzle generating the atomizing cone, and can store them together with the recorded image file in a manner associated therewith. In this way, the results of the evaluation of the captured image files can be associated with the respective nozzles such that they cannot be mixed up.

If the program-controlled evaluation shows an unacceptable deviation of a recorded image file, this is shown on the screen 12 of the recording unit together with the identification data of the associated nozzle. The operator can then replace the nozzle in question or can adjust the nozzle setting if possible.

What is claimed is:

1. Method for testing an agricultural spraying device that comprises a plurality of nozzles that are arranged at a spacing from one another, wherein each nozzle sprays a liquid under pressure, in a defined atomizing cone; the method comprising steps of:

provicing each individual nozzle with a transponder tag containing transponder information, the transponder information identifying each nozzle and/or a position of each nozzle in the spraying device;

reading the transponder information of the transponder tag and optically recording a region, near the nozzle, of the atomizing cone of each individual nozzle, in a direction perpendicular to the central axis of the atomizing cone, by using a recording device having a digital camera;

storing the recorded image of each individual nozzle as a digital image file and associated with the digital image file a code for identifying the respective nozzle and/or the position of the respective nozzle in the spraying device;

comparing each stored image file with an empirically determined reference image file; and determining and evaluating deviations between a stored image file and a reference image file in order to assess the state of a nozzle associated with an image file deviating from the reference image file.

2. Method according to claim 1, wherein, when each atomizing cone region is being optically recorded, a defined background surface is arranged behind the atomizing cone region when viewed from the camera.

3. Method according to claim 1, wherein the atomizing cone region is illuminated during the optical recording process.

4. Method according to claim 1, wherein an optically recorded image file of the atomizing cone region of a new nozzle of the type to be tested is used as the reference image file.

5. Method according to claim 1, wherein, when an atomizing cone region is being optically recorded, the pressure of the liquid supplied to the nozzles is measured and stored in a manner associated with the image files.

6. Method according to claim 3, wherein a reference image file generated using the measured pressure is used for comparison with the image files.

7. Method according to claim 1, wherein, when an atomizing cone region is being recorded, the pressure of the liquid supplied to the nozzles is set to a reference pressure which is suitable for comparison with the reference image file.

8. Method according to claim 1, wherein the time of the recording is associated with the stored image file and stored.

9. Method according to claim 1, wherein a mobile telecommunications appliance provided with a digital camera is used as the recording device.

10. Method according to claim 9, wherein the telecommunications appliance is provided with reference image files and/or a program application for evaluating the image file.

11. Method according to claim 1, wherein the image file recorded in each case is transmitted, together with the associated identification code for the nozzle, to an evaluation computer by means of wireless telecommunication for evaluation.

12. Method according to claim 1, wherein the recording device comprises a device for receiving and reading GNSS (global navigation satellite system) signals, and geodetic features indicating the location of the test are also stored together with the recorded image files.

* * * * *